US006313839B1

(12) United States Patent
Larson (10) Patent No.: US 6,313,839 B1
(45) Date of Patent: Nov. 6, 2001

(54) METHOD AND APPARATUS FOR PERFORMING Z BUFFER DEPTH COMPARISON OPERATIONS

(75) Inventor: Ronald D. Larson, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/178,525

(22) Filed: Oct. 23, 1998

(51) Int. Cl.[7] ..................................................... G06F 15/00
(52) U.S. Cl. ............................................................. 345/422
(58) Field of Search ................................... 345/422, 433, 345/113, 114, 421, 629, 630

(56) References Cited

U.S. PATENT DOCUMENTS 4,885,703 * 12/1989 Deering ................................. 345/422
4,907,174 * 3/1990 Priem ..................................... 345/422

OTHER PUBLICATIONS

Computer Graphic Proceedings, Annual Conference Series, 1993; Ned Green, et al.; Hierarchical Z–Buffer Visibility, pp. 231–238.

Computer Graphics Proceedings, Annual Conference Series, 1996; Ned Green w/Apple Computer; Hierarchical Polygon Tiling with Coverage Masks; pp. 65–74.

* cited by examiner

Primary Examiner—Phu K. Nguyen (57) ABSTRACT

A method and apparatus is provided for performing Z depth comparison tests in a computer graphics display system. The minimum and maximum Z values are calculated for each region of Z values stored in a Z buffer memory device. When a Z value to be tested is received, the Z value is tested against the maximum Z value to determine whether the primitive is occluded. The maximum Z value corresponds to the largest Z value of a region of Z values. The minimum Z value corresponds to the smallest Z value of all of the Z values of the region. If a determination is made that the primitive is not occluded, the received Z value is tested against the minimum Z value. If a determination is made that the received Z value is less than the minimum Z value, the received Z value is retained and is ultimately stored in the Z buffer memory element. The minimum and maximum Z values are updated using the Z values which are contained in the Z buffer memory element. The depth comparison tests may be performed in a frame buffer controller of a computer graphics display system. The controller may comprise a cache memory element for storing a region of Z values and the maximum and minimum Z values associated with the region used in the depth comparison tests. By using the cache memory device in this manner, the number of reads from the Z buffer memory device is reduced.

18 Claims, 4 Drawing Sheets

METHOD AND APPARATUS FOR PERFORMING Z BUFFER DEPTH COMPARISON OPERATIONS

TECHNICAL FIELD OF THE INVENTION

The present invention relates to computer graphics display systems and, more particularly, to a method and apparatus for performing Z buffer depth comparison operations in a computer graphics display system.

BACKGROUND OF THE INVENTION

Computer graphics display systems typically comprise a frame buffer memory which stores the color and Z coordinate associated with each pixel to be displayed on the monitor of the computer graphics display system. A frame buffer controller of the computer graphics display system controls the process of writing the Z coordinates and the colors of the pixels to the frame buffer memory. In many high-performance computer graphics display systems, Z buffer depth comparison tests are used to determine whether a new Z coordinate received in the frame buffer controller corresponds to a pixel that will be visible when displayed, or whether the pixel associated with the new Z coordinate will be occluded or hidden if displayed. If the pixel will be occluded, it is unnecessary to write the Z coordinate and the associated color to the frame buffer memory and the pixel can be discarded. On the other hand, if the pixel will be visible, the Z coordinate and the associated color must be written to the frame buffer memory.

In these types of systems, Z buffer depth comparison tests are performed by reading the old Z coordinate for the pixel from the Z buffer, comparing the old Z coordinate with the new Z coordinate, and, if the new Z coordinate passes the Z buffer depth comparison test, writing the new Z coordinate and the associated pixel color into the Z buffer and image buffer, respectively, of the frame buffer memory. Once these steps have been performed, the next pixel is processed in an identical manner.

Although this type of depth comparison test is needed to occlude hidden surfaces, performing depth comparison operations for each new Z coordinate received in the frame buffer controller requires significant memory bandwidth for reading the Z coordinates from the Z buffer.

Accordingly, a need exists for a method and apparatus for performing Z buffer depth comparison tests which reduce the number of reads to the frame buffer memory and thereby improve memory bandwidth efficiency.

SUMMARY OF THE INVENTION

The present invention provides a method and apparatus for performing Z depth comparison tests in a computer graphics display system. In accordance with the present invention, minimum and maximum Z values are calculated for each region of Z values stored in a Z buffer memory device. When a Z value to be tested is received, the Z value is tested against the maximum Z value to determine whether the primitive is occluded. The maximum Z value corresponds to the largest Z value of a region of Z values. The minimum Z value corresponds to the smallest Z value of all of the Z values of the region. If a determination is made that the primitive is not occluded, the received Z value is tested against the minimum Z value. If a determination is made that the received Z value is less than the minimum Z value, the received Z value is retained and is ultimately stored in the Z buffer memory element. The minimum and maximum Z values are updated using the Z values which are contained in the Z buffer memory element.

The apparatus of the present invention comprises a controller which receives the Z values to be tested and performs the depth comparison tests, and the Z buffer memory device, which is in communication with the controller. The Z buffer memory device stores the received Z values. The minimum and maximum Z values may be stored in the Z buffer memory device or in a separate Z limit buffer memory element in communication with the controller. Each primitive has Z values associated with each vertex of the primitive. Each received Z value is associated with a region of Z values in the Z buffer memory device.

The controller compares each Z value received in the controller with the maximum Z value for the corresponding region to determine whether the primitive associated with the received Z value is occluded. If a determination is made that the Z value is less than or equal to the maximum Z value for the region, the controller determines whether the received Z value is less than the minimum Z value for the region. If the controller determines that the received Z value is less than the minimum Z value for the region, the received Z value is output from the controller to the Z buffer memory device and is stored in the memory device. If a determination is made by the controller that the received Z value is less than the minimum Z value for the region, the minimum and maximum Z values for the region are updated using the received Z value.

If a determination is made by the controller that the received Z value is greater than or equal to the minimum Z value for the region, the controller reads an old Z value from the memory device and compares it to the received Z value, wherein if the received Z value is less than the old Z value, the received Z value is written by the controller to the memory element and the minimum and maximum Z values for the region corresponding to the received Z value are updated using the received Z value.

In accordance with the preferred embodiment of the present invention, the controller comprises a cache memory element for storing a region of Z values and the maximum and minimum Z values associated with the region. The values stored in the cache memory element are originally obtained from the Z buffer memory element. The minimum and maximum Z values may be obtained from the Z limit buffer memory element if they are initially stored therein. The controller compares each Z value received in the controller with the maximum Z value for the corresponding region stored in the cache memory device to determine whether the primitive associated with the received Z value is occluded.

If a determination is made that the Z value is less than or equal to the maximum Z value for the region, the controller determines whether the received Z value is less than the minimum Z value for the region stored in the cache memory element. If the controller determines that the received Z value is less than the minimum Z value for the region stored in the cache memory element, the controller stores the received Z value at a particular location in the cache memory element and tags the location with a tag indicating that location contains a valid Z value.

Preferably, prior to the controller comparing the received Z value with the maximum Z value for the corresponding region stored in the cache memory element, the controller determines whether the minimum and maximum Z values for the region associated with the received Z value are already contained in the cache memory element. If the minimum and maximum Z values are not contained in the cache memory element, the controller reads the minimum and maximum Z values from a Z limit buffer and stores them in the cache memory element. If a determination is made that the received Z value is greater than or equal to the minimum Z value for the region, the controller reads the old Z value from the Z buffer memory device and compares the old Z value with the received Z value.

If the controller determines that the received Z value is less than the old Z value read from the memory device, the received Z value is stored in a particular location in the cache memory element. The cache location is then tagged to indicate that it contains a valid Z value. When the cache memory element is flushed, only the Z values stored at the tagged locations in the cache memory element are written to the Z buffer memory device. After the cache memory device is flushed, the minimum and maximum Z values are updated.

Other features and advantages of the present invention will become apparent from the following discussion, drawings and claims.

DETAILED DESCRIPTION OF THE INVENTION

Figure 1:
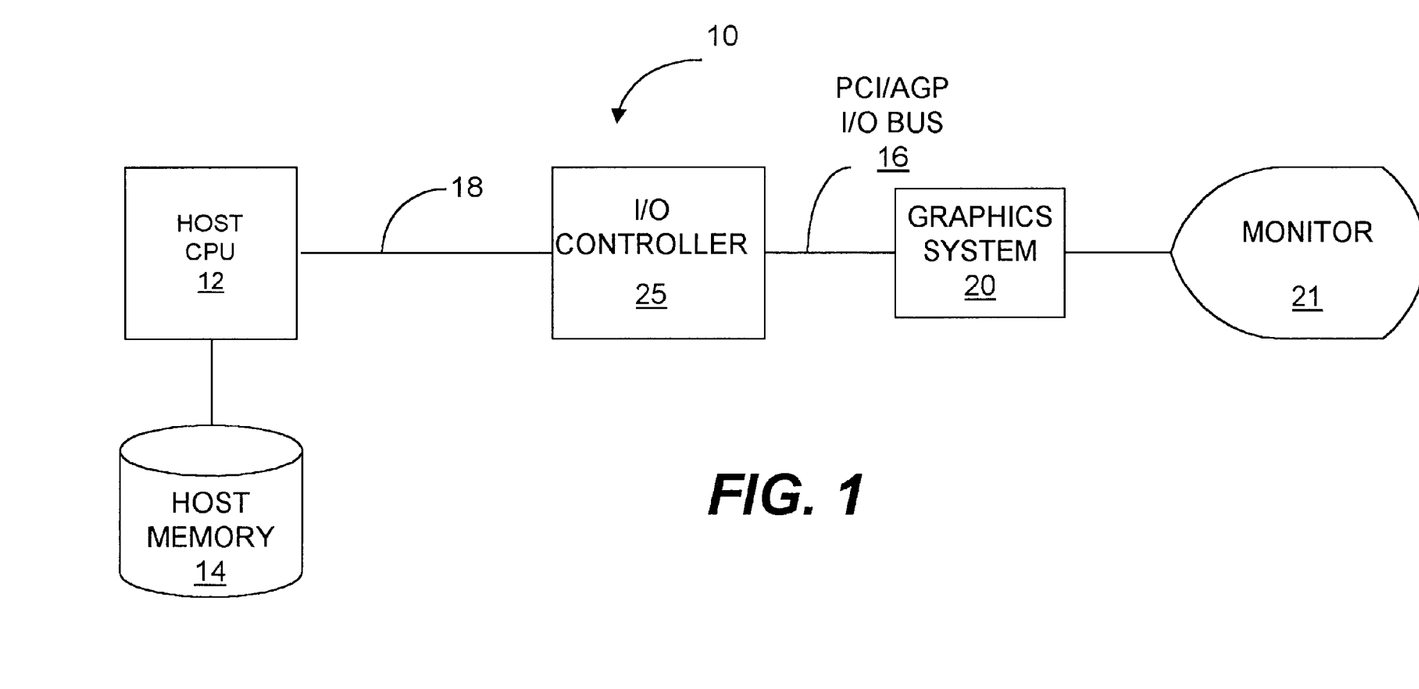
FIG. 1 is a block diagram of a computer graphics display system incorporating the graphics system of the present invention.

FIG. 1 is a block diagram of a computer graphics display system 10 which incorporates the method and apparatus of the present invention. The computer graphics display system 10 comprises a host CPU 12, a host memory device 14, a local bus 18, an input/output (I/O) controller device 25, an I/O bus 16, a graphics system 20, and a monitor 21 for displaying graphics information output from the graphics system 20.

The host CPU 12 processes input received from the console (not shown) of the computer graphics display system 10 and outputs commands and data over the local bus 18 to the I/O interface controller 25. The I/O interface controller 25 formats the commands and data utilizing the protocols of the I/O bus 16, which preferably is a Peripheral Component Interconnect (PCI)/Advanced Graphics Port (AGP) bus. The information received over the I/O bus 16 is input to the graphics system (GS) 20. The graphics system 20 then processes this information and causes graphics images to be displayed on the monitor 21.

Figure 2:
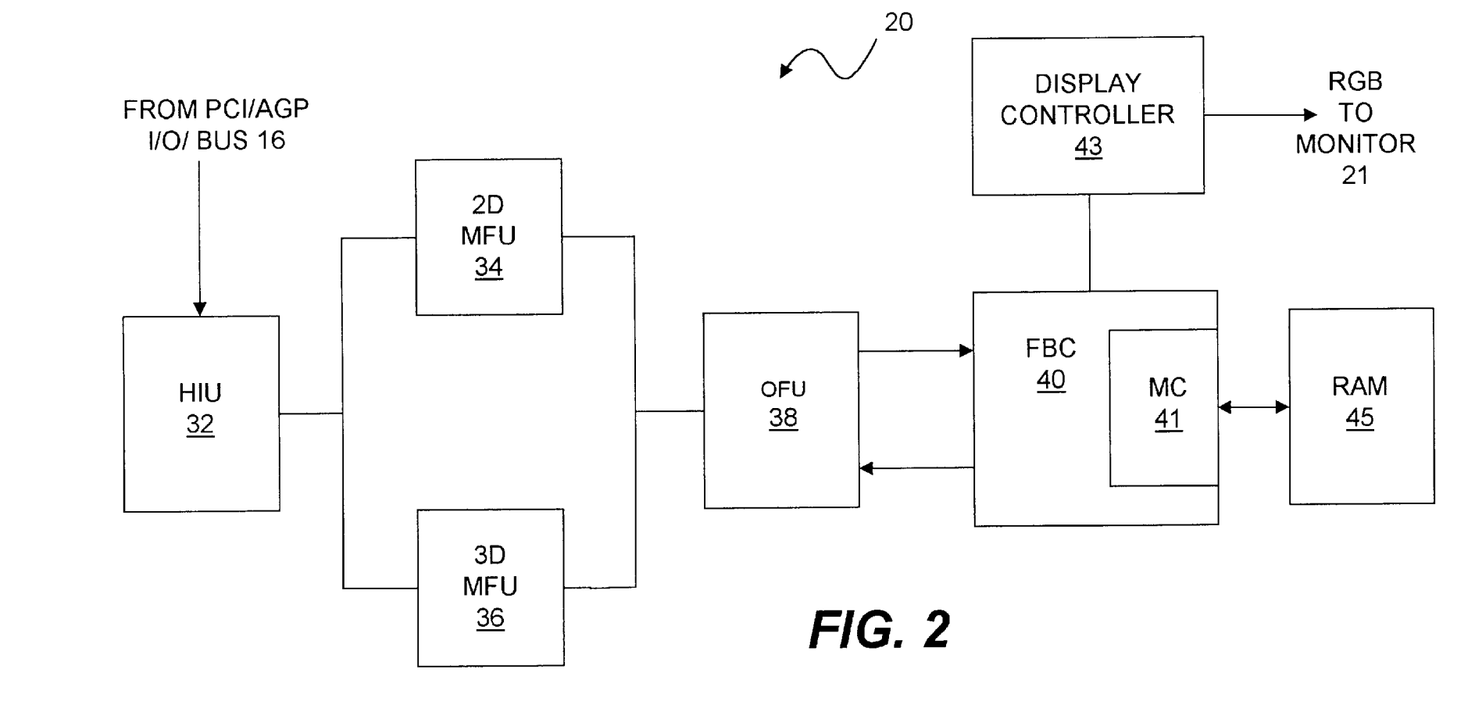
FIG. 2 is a block diagram of the graphics system of the computer graphics display system shown in FIG. 1.

FIG. 2 is a block diagram of the graphics system 20 of the present invention in accordance with the preferred embodiment. The host interface unit 32 fetches command data packets and texture maps from the host memory 14 via the I/O bus 16. The host interface unit 32 then provides graphics 2D information to the 2D macro-function unit 34 and 3D information to the 3D macro-function unit 36. The 2D macro-function unit 34 generates 2D vectors, text and rectangle spans. The 3D macro-function unit 36 performs triangle setup, 3D rastorization, and texture mapping.

The output from the 2D and 3D macro-function units 34 and 36 is received by the object function unit 38. The object function unit 38 performs rectangle clipping, patterning, frame buffer-to-frame buffer block transfers and rectangle span fills. The output of the object function unit 38 is received by the frame buffer controller (FBC) 40. The frame buffer controller 40 dispatches requests to the memory controller (MC) 41 to cause memory controller 41 to write and read pixel colors and Z coordinates to and from RAM 45. The frame buffer controller 40 also fetches display information which is sent to the display controller 43. The display controller 43 receives the display information and converts it into red, green and blue (RGB) analog data and sends it to the display monitor 21.

The memory controller 41 reads Z coordinate data out of RAM 45 which is used by the frame buffer controller 40 to perform Z buffer depth comparison operations. As the depth comparison operations are performed, the frame buffer controller 40 causes the memory controller 41 to write, when appropriate, Z coordinates and the colors associated with them to the Z buffer and to the image buffer comprised in RAM 45. The manner in which the depth comparison operations are performed is described below with reference to FIGS. 3 and 4.

Figure 3:
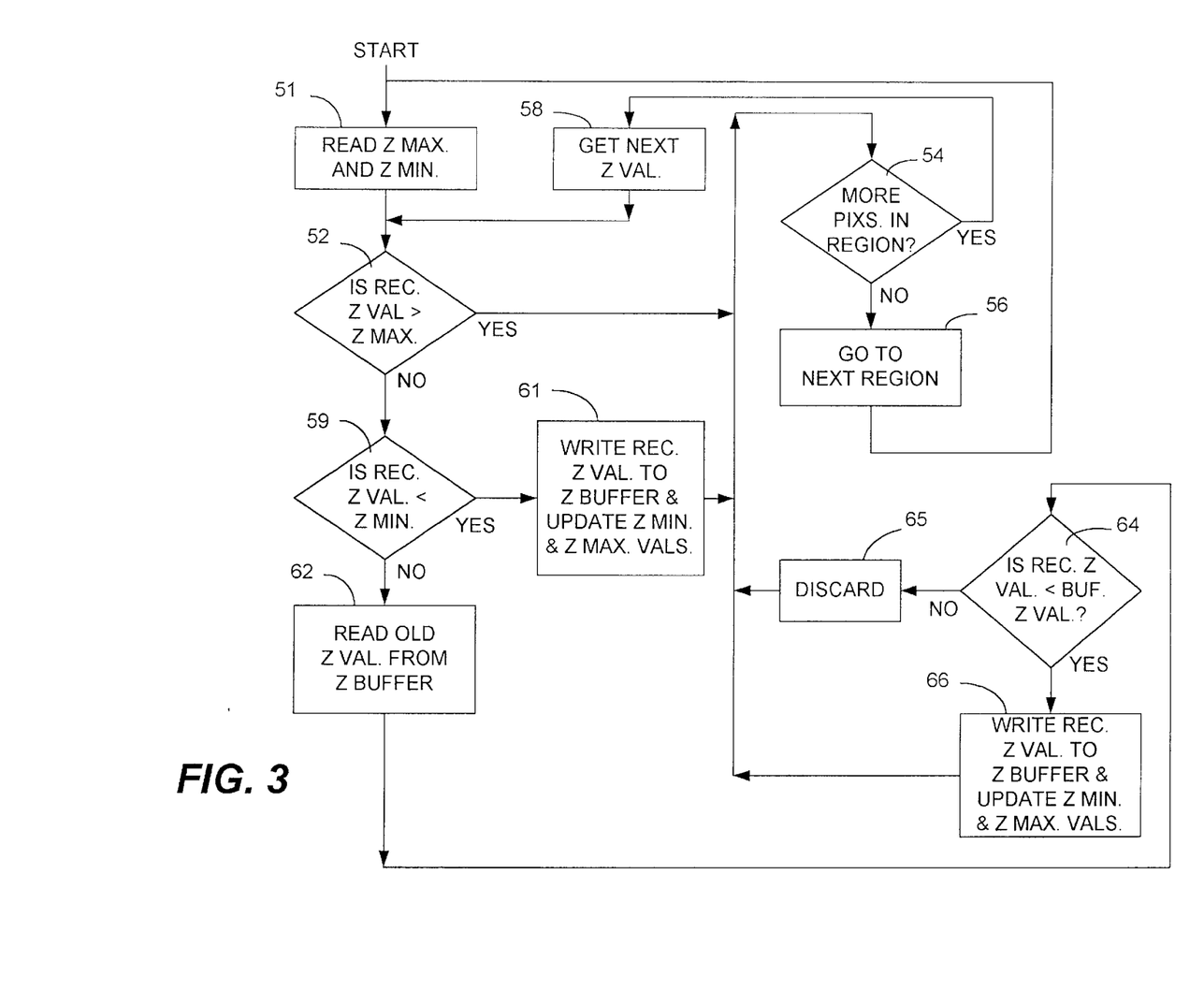
FIG. 3 is a flow chart illustrating the method of the present invention for performing Z buffer depth comparisons in accordance with a first embodiment of the present invention.

FIG. 3 is a flow chart illustrating a first embodiment of the present invention for performing Z depth comparison operations. When the Z buffer comprised by RAM 45 is first initialized, all of the Z values within each region are compared to determine the minimum Z value, Z MIN, and the maximum Z value, Z MAX, for each region. These Z MIN and Z MAX values are then stored in a memory area which preferably is outside of the Z buffer. This separate storage space, hereinafter referred to as the Z limit buffer, may be within RAM 45 or it may be a separate memory element within the graphics system 20 which is separately addressable by memory controller 41.

When the scan conversion process begins in a region of pixels, the Z MIN and Z MAX values are read out of the Z limit buffer by the memory controller 41, as indicated by block 51, so that they can be used by the frame buffer controller 40 to perform the depth comparison test for the pixels of the region. The regions are not limited to any particular number of pixels. A region may comprise, for example, a 4×4 group of pixels. The Z value of the first pixel of the region is then compared to the Z MAX value to determine whether the pixel Z value is greater than the Z MAX value, as indicated by block 52. If so, then the pixel is totally occluded and the process proceeds to block 54 where a determination is made as to whether the region contains anymore pixels to be compared. If not, the process proceeds to the next region to be tested, as indicated by block 56. If so, a determination is made at block 54 that there are more pixels in the region to be tested, the process proceeds to block 58 and then to block 52 where frame buffer controller 40 obtains the next Z value to be tested.

If at block 52 a determination is made that the current pixel Z value is not greater than Z MAX, a determination is made at block 59 as to whether the current pixel Z value is less than Z MIN. If the current pixel Z value is less than Z MIN, then the pixel is visible and the pixel Z value must be written to the Z buffer comprised by RAM 45. Therefore, the Z MIN value is then updated and the pixel Z value is written to the Z buffer, as indicated by block 61. If a determination is made at block 59 that the pixel Z value is not less than Z MIN, the pixel Z value stored in the Z buffer must be read out of the Z buffer, as indicated by block 62, and compared to the pixel Z value, as indicated by block 64.

If a determination is made at block 64 that the current pixel Z value is greater than or equal to the Z value read out of the Z buffer, then the pixel is occluded and can be discarded, as indicated by block 65. If the current pixel Z value is not greater than or equal to the Z value read out of the Z buffer, then the pixel is visible and the current pixel Z value must be written to the Z buffer and the Z MIN and Z MAX values must be updated, as indicated by block 66.

From each of blocks 61, 65 and 66, the process proceeds to block 54 to determine whether any more pixels in the current region need to be tested and then either to block 56 or to block 58, as discussed previously.

In many cases, the only Z values which will need to be read from the Z buffer are the Z MIN and Z MAX values because, in many cases, the Z values for the incoming pixels of a particular region will be either greater than the Z MAX value or less than the Z MIN value. Therefore, memory bandwidth associated with reading Z values to the Z buffer is significantly reduced.

Figure 4:
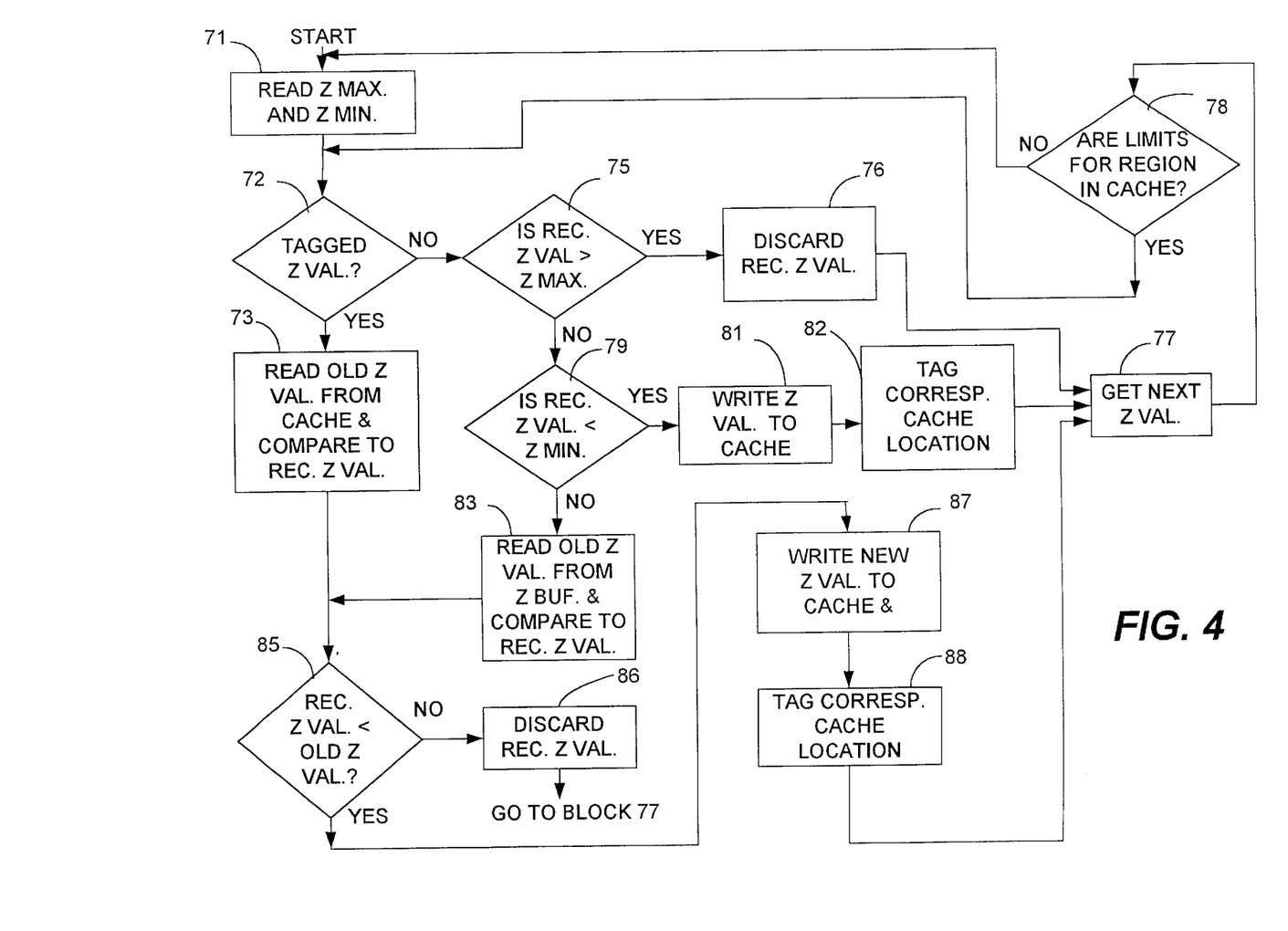
FIG. 4 is a flow chart illustrating the method of the present invention for performing Z buffer depth comparisons in accordance with the preferred embodiment of the present invention.

FIG. 4 illustrates the method of the present invention for performing the Z buffer depth comparisons in accordance with the preferred embodiment. This embodiment is similar to the embodiment discussed above with respect to FIG. 3 except that, in the preferred embodiment, cache memory is used to reduce the number of Z buffer accesses and Z limit buffer accesses and to speed up the Z buffer depth comparison test. In accordance with this embodiment, the cache memory element is comprised in the frame buffer controller 40. The cache memory element contains a sufficient number of locations for storing Z values for at least one region of pixels and the Z MAX and Z MIN values for the region. The present invention is not limited with respect to the size of the cache memory element or with respect to its location. Preferably, the cache memory element has a sufficient number of locations for storing the Z values for a plurality of regions and their associated Z MAX and Z MIN values.

In order to perform the Z buffer depth comparison test on a region, the Z MIN and Z MAX values for the region must be placed in the cache memory if they are not already contained in the cache memory. If the Z MIN and Z MAX values are not already contained in the cache memory, they are read out of the Z buffer and stored in the cache memory, as indicated at block 71. A determination is then made as to whether the Z value being tested, i.e., the Z value received in the frame buffer controller 40, corresponds to a location in the cache memory that already contains a valid Z value, as indicated by block 72. If the corresponding location in the cache memory already contains a valid Z value, the location will also contain a tag indicating that a valid Z value is already contained in the cache memory. Therefore, as indicated by block 73, this Z value, referred to as the OLD Z VAL. in FIG. 4, will be used to test the received Z value, referred to as the REC. Z VAL. in FIG. 4.

If a corresponding tagged entry is not contained in the cache memory, a determination is then made as to whether the received Z value is greater than Z MAX, as indicated by block 75. If so, the primitive is hidden and can be discarded, as indicated by block 76. The process then proceeds to block 77 and the next Z value to be tested is obtained. A determination is made as to whether the Z MIN and Z MAX values for the next pixel to be tested are already contained in the cache memory, as indicated by block 78. If not, the Z MIN and Z MAX values for the region associated with the Z value to be tested are read out of the Z limit buffer and stored in the cache memory at block 71. If the Z MIN and Z MAX values for the region are already contained in the cache memory, the process returns to block 72.

It should be noted that all of the Z values for a particular region do not have to be tested in the frame buffer controller 40 before a Z value associated with a different region can be tested. In accordance with the present invention, a Z value corresponding to one region can be tested and then a Z value corresponding to a second region can be tested. Therefore, there is no requirement that the frame buffer controller 40 receive and test Z values for one region before receiving and testing Z values for another region. If the cache memory has sufficient locations for storing the Z values for multiple regions and their associated Z MIN and Z MAX values, Z values for multiple regions can be tested against the values stored in the cache memory, thus reducing the number of reads from the Z buffer and Z limit buffer. If the Z MIN and Z MAX values for a region associated with a Z value to be tested are not contained in the cache memory, the Z MIN and Z MAX values are simply read out of the Z limit buffer and stored in the cache memory.

If a determination is made at block 75 that the primitive is not occluded, the process proceeds to block 79 where a determination is made as to whether the primitive is visible. The received Z value is then compared with the Z MIN value. If the received Z value is less than Z MIN, the primitive is visible. In this case, the received Z value is written to the corresponding location in cache memory, as indicated by block 81. The cache memory location that was written with the received Z value is then tagged to indicate that the cache memory location contains a valid Z value, as indicated by block 82. When the cache memory is flushed, only the Z values stored in the tagged locations in the cache memory will be written back into the Z buffer. When the cache memory is flushed, the Z MIN and Z MAX values will be updated using the Z values for the region, including the new Z values corresponding to the tagged entries.

If a determination is made at block 79 that the received Z value is not less than Z MIN, then the received Z value must be compared with the old Z value stored for the corresponding pixel in the corresponding region in the Z buffer, as indicated by block 83. Therefore, the old Z value is read from the Z buffer and tested against the received Z value, as indicated by block 85. Therefore, a determination is then made at block 85 as to whether the received Z value is less than the old Z value. This determination is also made using the old Z value stored in the cache memory and the received Z value when the process proceeds to block 73. If a determination is made at block 85 that the received Z value is not less than the old Z value, the primitive is hidden and can be discarded, as indicated by block 86. If so, the primitive is visible and, therefore, is written to cache memory, as indicated by block 87. The location in cache memory written with the new Z value is then tagged to indicate that the location contains a valid Z value, as indicated by block 88. The process then proceeds to block 77 and the next Z value to be tested is obtained.

By implementing a cache memory element in the frame buffer controller 40 in this manner, the Z buffer depth comparison operations are performed faster than if the Z values had to be read out of the Z buffer into the frame buffer controller 40. Furthermore, the amount of memory bandwidth required for reading the Z values out of the Z buffer is reduced.

In accordance with an alternative embodiment, memory bandwidth can be further reduced by utilizing a second tag in conjunction with the tag mentioned above to identify the cache memory locations needing to be written back to the Z buffer. In accordance with this embodiment, if a value from the Z buffer has been read out of the Z buffer and stored in the cache memory, but a Z comparison against that value does not cause it to be updated, then the Z value does not need to be written back into the Z buffer. Since this location does not contain a Z value that needs to be written back into the Z buffer, it will not be tagged with the second tag. Consequently, when the cache memory is flushed, only the Z values tagged with the second tag will be written to the Z buffer.

In accordance with another embodiment of the present invention, two separate cache memory elements are implemented for storing the pixel Z values and the Z MAX and Z MIN values. One of the cache memory elements is utilized for storing the Z values for one or more regions and the other is utilized for storing the Z MAX and Z MIN values for the regions. By providing separate cache memory elements for storing the Z values and the Z MAX and Z MIN values, the Z MAX and Z MIN values do not have to be flushed when the Z values are flushed. This allows the Z MIN and Z MAX values to be retained in cache. This allows the Z MIN and Z MAX values for a region to be used for testing if the same region is tested again subsequent to the Z values being written to the Z buffer. This also allows more Z MAX and Z MIN pairs to be stored within the frame buffer controller 40 than if the Z MAX and Z MIN values were stored in the same cache memory element as the Z values.

In accordance with this embodiment, whenever the cache memory element contains Z values that must be written to the Z buffer, i.e., tagged entries, the Z MIN and Z MAX values are updated before the cache memory element containing the Z values is flushed and the Z values are written to the Z buffer. If a region which was previously tested in accordance with the Z buffer depth comparison test is subsequently tested, the Z MIN and Z MAX values for the region will already be contained in the cache memory element and therefore will not have to be read out of the Z limit buffer. This aspect of the present invention further expedites the depth comparison process and reduces memory bandwidth.

In accordance with another embodiment of the present invention, the Z buffer depth comparison test of the present invention is used in conjunction with a Z buffer comparison technique disclosed in U.S. Pat. No. 5,301,263, which is incorporated herein by reference. This patent discloses using only the most significant bits of the Z values being compared to determine whether a pixel is visible or occluded. Each Z value is defined by a plurality of bytes. For example, it is known to define a Z value by 3 bytes. In accordance with the present invention, the Z buffer depth comparison operations can be performed using only the most significant bits of the Z values. For example, in the step performed in block 52 in FIG. 3, the most significant byte of the pixel Z value for the pixel being tested may be compared to the most significant byte of the Z MAX value. If these bytes represent equal numbers, the comparison can proceed to the next bytes of the pixel Z value and of the Z MAX value. This process can continue, if necessary, until the least most significant byte is reached.

Therefore, the present invention provides several embodiments which can be implemented separately or in combination in order to reduce read/write memory bandwidth requirements while, at the same time, increasing throughput. It should be noted that the present invention has been described with respect to the preferred embodiments, but that the present invention is not limited to these embodiments. It should also be noted that, although the present invention is especially suitable for use in a computer graphics display system, the present invention is not required to be implemented in such a system. Those skilled in the art will understand that the present invention is suitable for use in other types of computer systems for reducing memory access bandwidth. Also, some computer graphics display systems utilize a multi-bank frame buffer memory and a memory controller for each bank in order to allow one bank to be paged while another bank is being re-paged. Although a single-bank architecture has been illustrated in FIG. 2 to simplify the discussion of the present invention, it will be understood by those skilled in the art that the Z buffer depth comparison method and apparatus of the present invention can be used with either type of architecture.

It should also be noted that the present invention is not limited with respect to the locations of the memory elements utilized in accordance with the present invention, with respect to the size of the memory elements, or with respect to the physical structure of the memory elements. The memory elements can, where desired, be physically comprised in the same memory device. Of course, it will be understood by those skilled in the art that it is desirable in some cases to use separate memory elements to facilitate addressing requirements. Those skilled in the art will understand that other modifications may be made to the embodiments discussed above without deviating from the scope of the present invention.

What is claimed is:

1. An apparatus for performing Z depth comparison tests in a computer graphics display system, the apparatus comprising:

a frame buffer memory controller receiving primitives relating to an image to be displayed on a display monitor of the computer graphics display system, the primitives having a Z value associated with each vertex of the primitive; and a frame buffer memory device in communication with the controller, the memory device storing Z values of primitives to be displayed on the display monitor, each received Z value being associated with a region of Z values in the memory device, the memory device storing maximum and minimum Z values for regions of primitives, the maximum Z value corresponding to a largest Z value of a region of Z values, the minimum Z value corresponding to a smallest Z value of all of the Z values of the region, the controller comparing each Z value received in the controller with the maximum Z value for the corresponding region to determine whether the primitive associated with the received Z value is occluded.

2. The apparatus of claim 1, wherein if a determination is made that the Z value is less than or equal to the maximum Z value for the region, the controller determines whether the received Z value is less than the minimum Z value for the region, wherein if the controller determines that the received Z value is less than the minimum Z value for the region, the received Z value is output from the controller to the memory device and is stored in the memory device.

3. The apparatus of claim 2, wherein if a determination is made by the controller that the received Z value is less than the minimum Z value for the region, the minimum and maximum Z values for the region are updated using the received Z value.

4. The apparatus of claim 3, wherein if a determination is made by the controller that the received Z value is greater than or equal to the minimum Z value for the region, the controller reads an old Z value from the memory device and compares it to the received Z value, wherein if the received Z value is less than the old Z value, the received Z value is written by the controller to the memory element and the minimum and maximum Z values for the region corresponding to the received Z value are updated using the received Z value.

5. An apparatus for performing Z depth comparison tests in a computer graphics display system, the apparatus comprising:

a frame buffer memory device, the memory device storing Z values of primitives to be displayed on the display monitor, the memory device storing maximum and minimum Z values for regions of primitives, the maximum Z value corresponding to a largest Z value of a region of Z values, the minimum Z value corresponding to a smallest Z value of all of the Z values of the region; and a frame buffer memory controller receiving primitives relating to an image to be displayed on a display monitor of the computer graphics display system, the primitives each having a Z value associated with each vertex of the primitive, each received Z value being associated with a region of Z values in the memory device, the controller comprising a cache memory element for storing a region of Z values and the maximum and minimum Z values associated with the region, the controller comparing each Z value received in the controller with the maximum Z value for the corresponding region stored in the cache memory device to determine whether the primitive associated with the received Z value is occluded.

6. The apparatus of claim 5, wherein if a determination is made that the Z value is less than or equal to the maximum Z value for the region, the controller determines whether the received Z value is less than the minimum Z value for the region stored in the cache memory element, wherein if the controller determines that the received Z value is less than the minimum Z value for the region stored in the cache memory element, the controller stores the received Z value at a particular location in the cache memory element and tags said particular location with a tag, the tag indicating that said particular location contains a valid Z value.

7. The apparatus of claim 6, wherein prior to the controller comparing the received Z value with the maximum Z value for the corresponding region stored in the cache memory element, the controller determines whether the minimum and maximum Z values for the region associated with the received Z value are already contained in the cache memory element, wherein if the minimum and maximum Z values are not contained in the cache memory element, the controller reads the minimum and maximum Z values from a Z limit buffer and stores them in the cache memory element.

8. The apparatus of claim 7, wherein if a determination is made that the received Z value is greater than or equal to the minimum Z value for the region, the controller reads the old Z value from said memory device and compares the old Z value with the received Z value, wherein if the controller determines that the received Z value is less than the old Z value read from the memory device, the received Z value is stored in a particular location in the cache memory element, and wherein said particular location is tagged with said tag to indicate that said particular location contains a valid Z value.

9. The apparatus of claim 8, wherein when the cache memory element is flushed, only the Z values stored at the tagged locations in the cache memory element are written to said memory device.

10. A method for performing Z depth comparison tests in a computer graphics display system, the method comprising the steps of:

receiving, in a frame buffer memory controller, primitives relating to an image to be displayed on a display monitor of the computer graphics display system, the primitives having a Z value associated with each vertex of the primitive, wherein a frame buffer memory device contains Z values of primitives to be displayed on the display monitor, each received Z value being associated with a region of Z values in the memory device, the memory device storing maximum and minimum Z values for regions of primitives, the maximum Z value corresponding to a largest Z value of a region of Z values, the minimum Z value corresponding to a smallest Z value of all of the Z values of the region; and in the frame buffer memory controller, comparing each Z value received in the controller with a maximum Z value for the corresponding region to determine whether the primitive associated with the received Z value is occluded.

11. The method of claim 10, wherein if a determination is made by the controller that the Z value is less than or equal to the maximum Z value for the region, the controller determines whether the received Z value is less than the minimum Z value for the region, wherein if the controller determines that the received Z value is less than the minimum Z value for the region, the received Z value is output from the controller to the memory device and is stored in the memory device.

12. The method of claim 11 wherein if a determination is made by the controller that the received Z value is less than the minimum Z value for the region, the minimum and maximum Z values for the region are updated using the received Z value.

13. The method of claim 12, wherein if a determination is made by the controller that the received Z value is greater than or equal to the minimum Z value for the region, the controller reads an old Z value from the memory device and compares it to the received Z value, wherein if the received Z value is less than the old Z value, the received Z value is written by the controller to the memory element and the minimum and maximum Z values for the region corresponding to the received Z value are updated using the received Z value.

14. A method for performing Z depth comparison tests in a computer graphics display system, the method comprising the steps of:

receiving in a frame buffer memory controller, primitives relating to an image to be displayed on a display monitor of the computer graphics display system, the primitives each having a Z value associated with each vertex of the primitive, each received Z value being associated with a region of Z values in a frame buffer memory device, the memory device containing Z values of primitives to be displayed on the display monitor, the memory device storing maximum and minimum Z values for regions of primitives, the maximum Z value corresponding to a largest Z value of a region of Z values, the minimum Z value corresponding to a smallest Z value of all of the Z values of the region the controller comprising a cache memory element for storing a region of Z values and the maximum and minimum Z values associated with the region; and in the frame buffer memory controller, comparing each Z value received with the maximum Z value for the corresponding region stored in the cache memory device to determine whether the primitive associated with the received Z value is occluded.

15. The method of claim 14, wherein if a determination is made by the controller that the Z value is less than or equal to the maximum Z value for the region, the controller determines whether the received Z value is less than the minimum Z value for the region stored in the cache memory element, wherein if the controller determines that the received Z value is less than the minimum Z value for the region stored in the cache memory element, the controller stores the received Z value at a particular location in the cache memory element and tags said particular location with a tag, the tag indicating that said particular location contains a valid Z value.

16. The method of claim 15, wherein prior to the comparing step, the controller determines whether the minimum and maximum Z values for the region associated with the received Z value are already contained in the cache memory element, wherein if the minimum and maximum Z values are not contained in the cache memory element, the controller reads the minimum and maximum Z values from a Z limit buffer and stores them in the cache memory element.

17. The method of claim 16, wherein if a determination is made that the received Z value is greater than or equal to the minimum Z value for the region, the controller reads the old Z value from said memory device and compares the old Z value with the received Z value, wherein if the controller determines that the received z value is less than the old Z value read from the memory device, the received Z value is stored in a particular location in the cache memory element, and wherein said particular location is tagged with said tag to indicate that said particular location contains a valid Z value.

18. The method of claim 17, wherein when the cache memory element is flushed, only the Z values stored at the tagged locations in the cache memory element are written to said memory device.

* * * * *